March 28, 1933.  N. E. WOOLMAN  1,903,078
VALVE MECHANISM
Filed Jan. 8, 1929  4 Sheets-Sheet 1
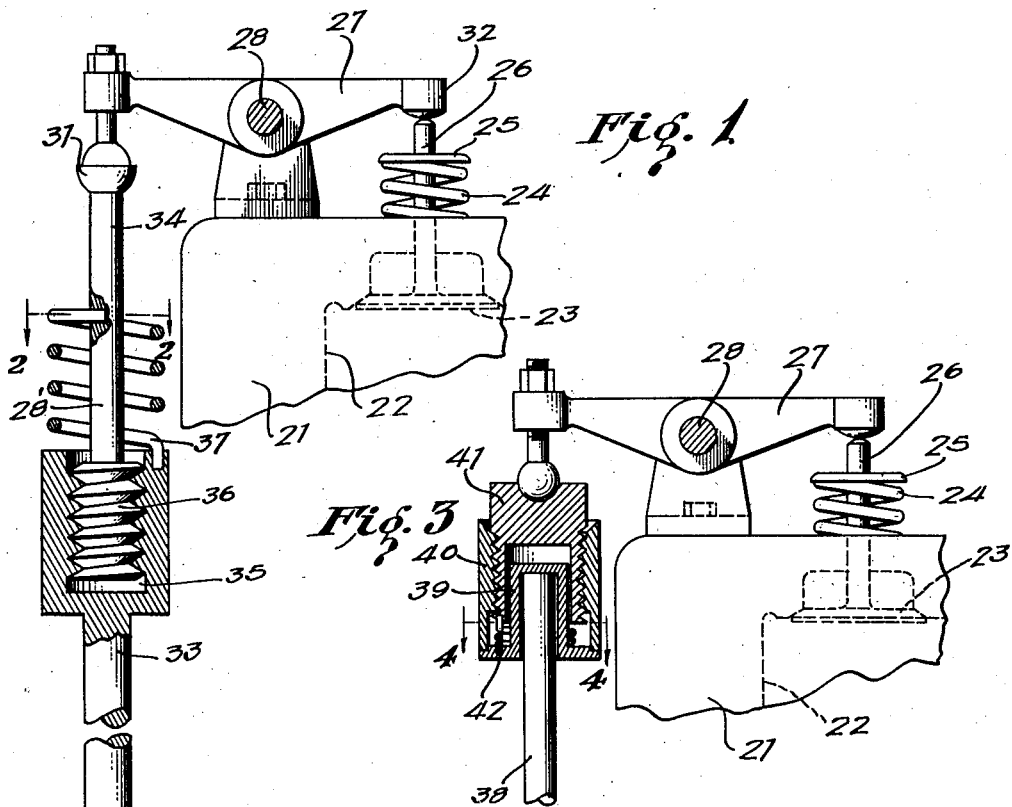
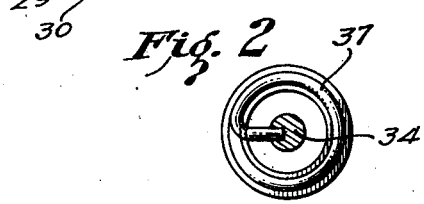
INVENTOR
Nelson E. Woolman
By John Flam
ATTORNEY

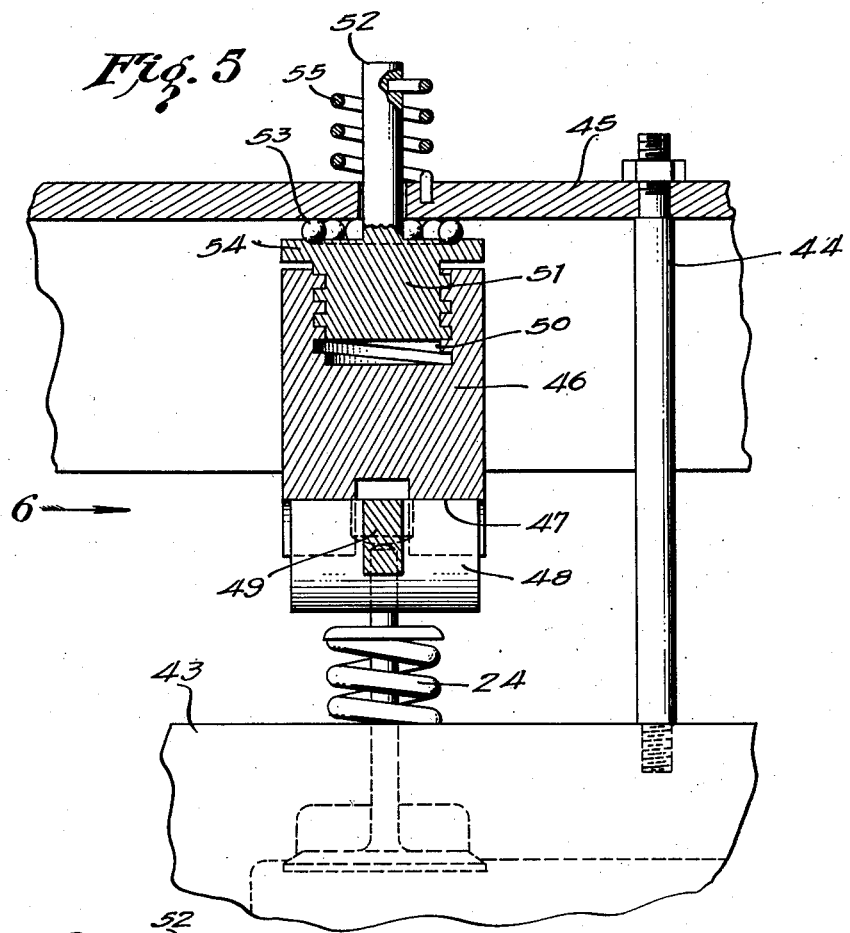
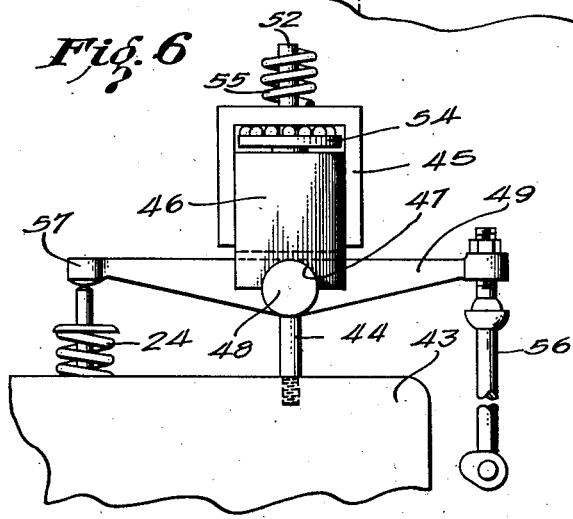

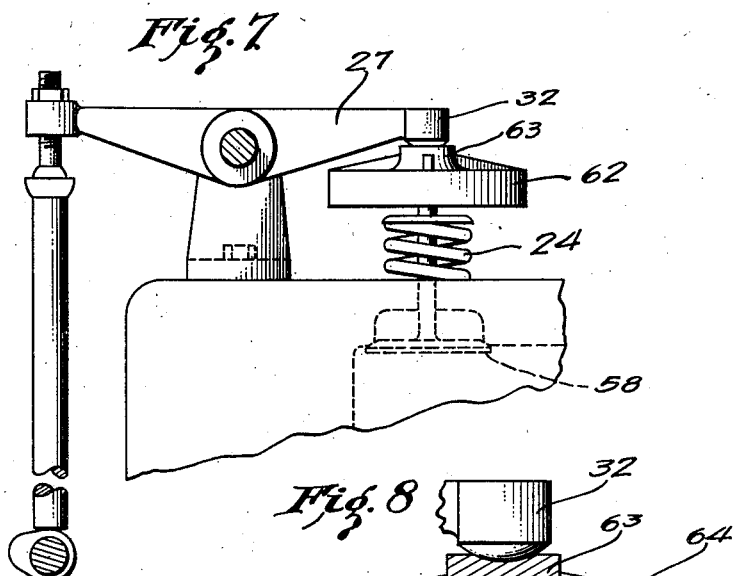
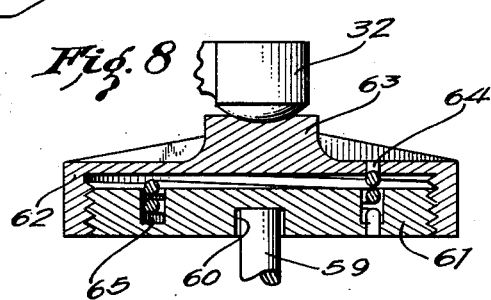
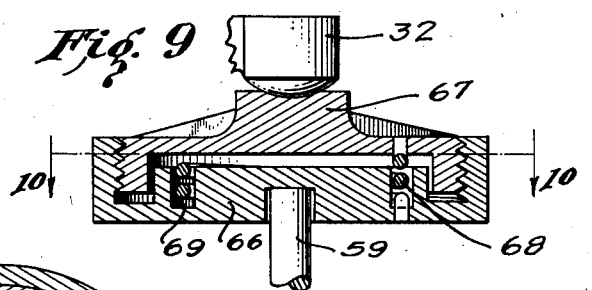
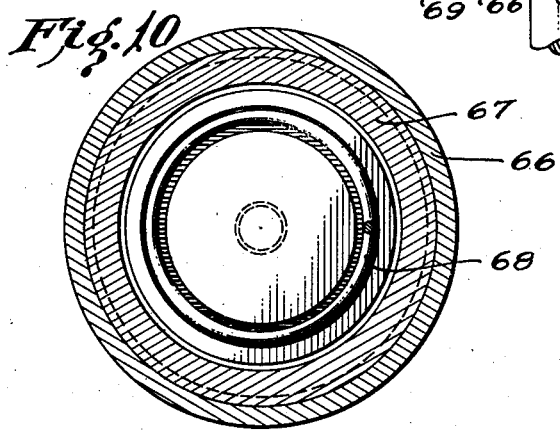

March 28, 1933.　　　N. E. WOOLMAN　　　1,903,078
VALVE MECHANISM
Filed Jan. 8, 1929　　　4 Sheets-Sheet 4
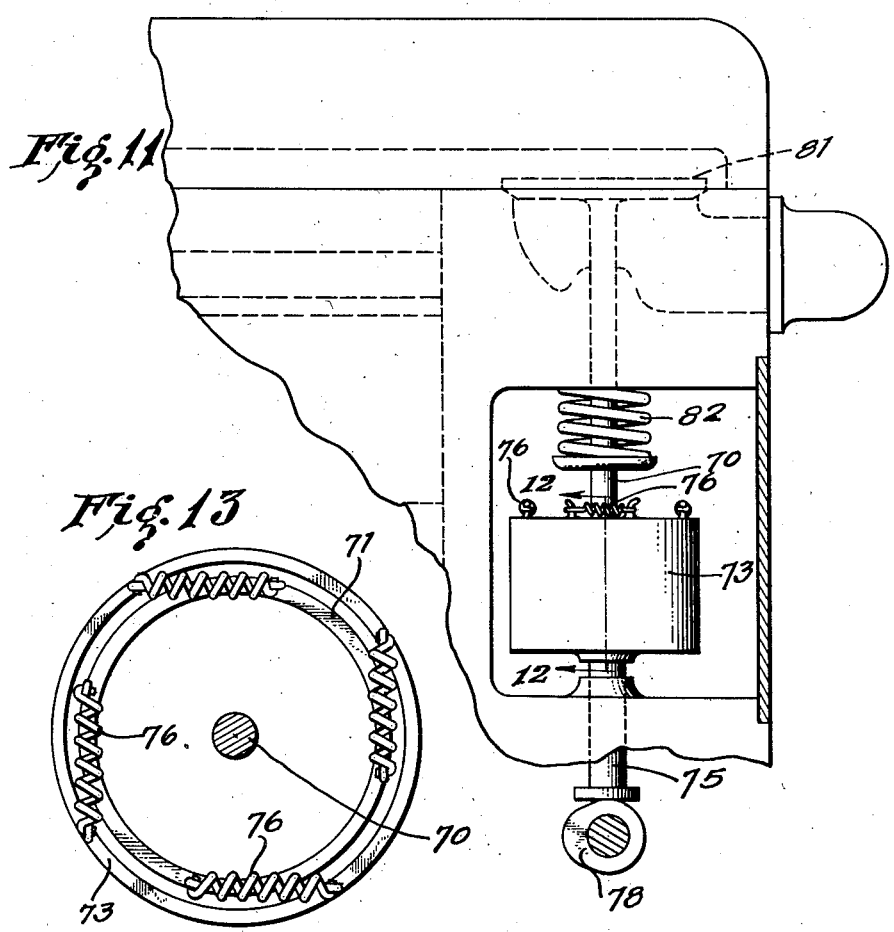
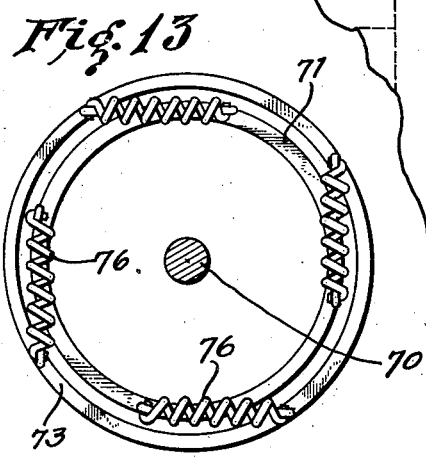
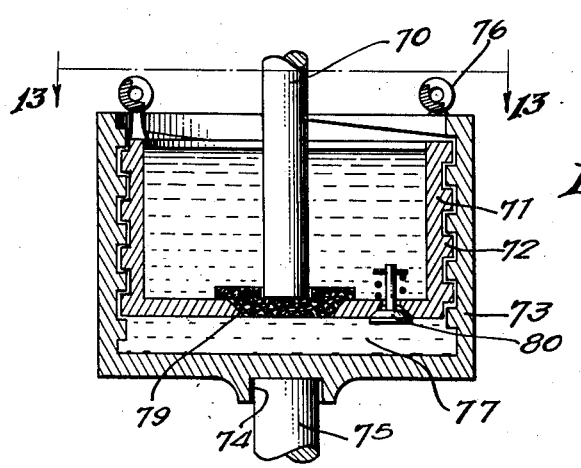
INVENTOR
Nelson E. Woolman
By John Flann
ATTORNEY Patented Mar. 28, 1933

1,903,078

UNITED STATES PATENT OFFICE

NELSON E. WOOLMAN, OF HERMOSA BEACH, CALIFORNIA, ASSIGNOR TO GENERAL MOTORS RESEARCH CORPORATION

VALVE MECHANISM

Application filed January 8, 1929. Serial No. 331,110.

This invention relates to valves and to the mechanism for opening and closing them. More particularly, it refers to poppet valves, such as are used to control inlet and outlet ports for internal combustion engine cylinders.

In my prior application, Serial No. 311,534, filed October 10, 1928 and entitled "Rocker arm mechanism", I disclose a scheme for operating such valves in an improved manner. That scheme aimed to provide a smooth, noiseless operation of the valve mechanism. My present invention relates to the same subject matter, the smoothness of operation being obtained however by a different form of mechanism.

Usually each of the poppet valves has a stem portion that projects out of the cylinder block, and a strong spring is used to urge the valve to its normal position. By the aid of a cam arrangement operated from the engine shaft, the stem is operated upon to overcome the force of the spring and to operate the valve. Sometimes a push rod is interposed directly between the cam and the valve stem; and sometimes a rocker arm is used in addition to the push rod. In either case, temperature changes in the mechanism, which are inevitable in internal combustion engines, produce variations in the length of the stem and the push rod. For this reason, it is common to allow a slight clearance between these parts when the engine is cold.

This clearance is difficult to adjust. If too great, the valves are not operated in proper sequence with the cams; and a very noisy click results that is due to the striking of the parts. If too small, the expansion of the push rod and valve stem on temperature rise may be sufficient to prevent the valve from returning to its normal position under the influence of its spring.

In my prior application, I obviate this by a rocker arm mechanism which is floating and which can adjust itself to all temperature conditions. This is shown as accomplished by the aid of a dash pot arrangement using a fluid such as oil. When the cam operates the valve, the dash pot acts to permit the cam to transfer its force without lost motion to the valve; and the dash pot arrangement acts to keep the parts in contact without lost motion.

It is one of the objects of my invention to improve in general over this type of mechanism; and especially to simplify it, as by eliminating the necessity of using a fluid.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a view, partly in section, of a valve mechanism embodying my invention, shown as associated with a cylinder block;

Fig. 2 is a sectional view, taken along plane 2—2 of Fig. 1;

Fig. 3 is a view similar to Fig. 1, of a modified form of my invention;

Fig. 4 is a sectional view, taken along plane 4—4 of Fig. 1;

Fig. 5 is a fragmentary sectional view of a further modified form of my invention;

Fig. 6 is a side view, taken in the direction of arrow 6 of Fig. 5, but on a reduced scale;

Fig. 7 is a side view of a further modification of my invention;

Fig. 8 is an enlarged detail sectional view thereof;

Fig. 9 is a view similar to Fig. 8 of a modification;

Fig. 10 is a sectional view, taken along plane 10—10 of Fig. 9;

Fig. 11 is a fragmentary view, partly in section, of another form of valve mechanism embodying my invention, in which the valve is actuated by an upward push;

Fig. 12 is an enlarged sectional view, taken along plane 12—12 of Fig. 11; and

Fig. 13 is a sectional view taken along plane 13—13 of Fig. 12.

In the embodiment shown in Figs. 1 and 2, I show a cylinder block 21. In this block there may be a plurality of cylinder bores, such as 22, the inlet and outlet ports of which may be controlled by poppet valves, such as 23. This is all old and well known in this field. The valves can be normally held in normal position as by compression spring 24, serving to seat the valve, and acting on flange 25 fastened to the valve stem 26.

In the present instance, the valve stem 26 projects upwardly and out of block 21, where it can be depressed against the action of stiff spring 24 to unseat it. This depression is secured as by rocker arm 27 at proper timed instants. Rocker arm 27 is arranged to be rocked in a clockwise direction about its shaft 28, as by the aid of a push rod 28' actuated by cam 29 on a cam shaft 30. This rod has a ball and socket connection 31 with one arm of rocker arm 27, so that as cam 29 lifts the rod 28, the rocker arm 27 rotates so as to depress the stem 26.

Ordinarily there is a slight clearance left between the pad 32 on arm 27 and the top of stem 26 when the cam 29 is inactive. This permits expansion of the parts as the engine heats up, without danger of improperly unseating the valve. With my arrangement, no such clearance is needed; instead, the pad 32 is in contact with the top of stem 26 at all times. I accomplish this result by making push rod 28' in two parts; a lower part 33 and an upper part 34 that are urged apart so as to expand rod 28' to a point just sufficient to take up the clearances; and yet which provides a large resistance against shortening when a compressive stress is placed on the rod.

Thus lower portion 33 has a socket 35 internally threaded with coarse threads—say about from four to ten threads per inch. The upper portion 34 has a plug 36 having corresponding external threads. A torsion spring 37 is arranged to exert a turning force between the two parts, and in such a direction as to tend to separate the two parts. Thus one end of the spring 37 is anchored in rod 34, and the other end in socket 35.

The pitch of the interengaging threads determines the action of the device. Let us assume that the parts are inactive; that is, that cam 29 has not yet arrived at its lifting position. Under such circumstances, spring 37 causes just sufficient expansion of parts 35, 35 to permit engagement of pad 32 with stem 26. The force exerted by spring 37 is insufficient to overcome the stiff spring 24, and valve 23 remains seated.

Now as cam 29 lifts rod 28', the axial thrust has a tendency to shorten rod 28'; but this thrust is operating at a large mechanical disadvantage, so that little shortening takes place during the quick movement of cam 29 to depress the stem 26. The axial thrust operates as a force parallel to the shorter face of the right angle at the base of an inclined plane, which plane is represented by the screw thread surface. The pitch being sufficiently large to make this plane steep, the axial thrust can cause this motion; but the compression is slight, and most of the force is used to compress spring 24. When the thrust is released, spring 37 acts to return the parts to normal position. The previous slight compression of the device permits rapid seating of the valve as the thrust is released. This compression must be of such an amount as to permit this action without clicking; that is, the compression must be gauged accurately and must of course be of relatively small amount. In case there is an expansion of the parts due to heat, or any variation of the parts due to any cause, the spring 37 will take up these variations.

It is to be noted that the device requires no fluid dash pots of any kind. This is due to the use of a large pitch screw that acts as an inclined plane, and operated by a resilient device, such as a torsion spring.

The screw arrangement can be constructed in a wide variety of ways. In the form shown in Figs. 3 and 4, the push rod 38 is inserted in a thimble 39 that forms one part of a socket 40. A screw plug 41 screws into the socket 40, and engages the left hand end of arm 27. Spring 42, anchored at its ends to thimble 39 and to plug 41, serves to urge these two parts to unscrew the threads. The operation of the device is entirely similar to that of Figs. 1 and 2.

In the form shown in Figs. 5 and 6, the take-up of the lost motion is accomplished by making the axis of the rocker arm floating, as in my prior application. In this case, the cylinder head 43 supports, as by stay-rods 44, a channel 45 in which are slidable one or more of the rocker arm saddles 46. The saddle illustrated has cylindrical seat 47 at its bottom to accommodate the boss 48 of rocker 49. In the present instance, saddle 46 has a threaded aperture 50 at the top (square threads being shown) in which is accommodated the cooperating plug 51, having a stem 52 extending outside of the channel guide 45. This plug has a free rotation in the aperture 50, and ball bearings 53 can be placed between flange 54 on this plug and the top of channel guide 45. A torsion spring 55 has its ends anchored respectively in stem 55 and in the top of channel 45, and is arranged to exert a rotative force for moving the plug out of aperture 50. The pitch of the square threads is such that an axial thrust due to the lift on push rod 56 will not cause material movement of the plug 51 into apertures 50. But when the rod 56 recedes, the spring 55 causes a rapid unscrewing of the plug 51 so as to take up all slack. As before, spring 55 is too weak to overcome the stiff valve spring 24.

The operation is similar to that described in my prior application. Upward thrust of rod 56 will be translated mainly as a downward movement of rocker arm pad 57, the hub 48 remaining substantially stationary. When the rod 56 recedes, the plug 51 moves out enough to keep the pad 57 in engagement with the valve stem.

In Figs. 7 and 8, I illustrate a form of my invention in which the expansible elements are associated with the valve stem. In this form the rocker arm 27 acts to unseat the valve 58, which has a stem 59. The end of this stem projects into a recess 60 in the bottom of the plug 61. This plug is provided with coarse screws threading into the socket member 62. This socket member has a boss 63 on its upper side on which the rocker arm pad 32 rests. A torsion spring 64 is accommodated in an annular groove 65 in plug 61, and is anchored at its ends respectively in plug 61 and in socket 62. The arrangement is such that the spring 64 tends to separate the two parts 61, 62, but with a force insufficient to overcome the stiff valve spring 24. The operation of this form is similar to that of the others already described.

In Figs. 9 and 10, substantially the same form of mechanism is described; except that the plug and socket are reversed. The stem 59 here projects into the socket part 66, and plug 67 is located above it. The torsion spring 68 is accommodated in an annular groove 69 in socket 66.

In Figs. 11, 12 and 13, I show a form in which the valve stem 70 projects downwardly. This stem extends into a hollow cup 71 fitted with coarse external square threads 72 (from four to ten per inch). These threads engage into casing 73, the bottom of which has a socket 74 for the accommodation of a push rod 75. One or more helical springs 76 are so arranged as to tend to unscrew the parts 71, 73 and thereby to separate the bottom of cup 71 from the bottom of casing 73. As thus far described, this form operates substantially as the former modifications. The stem 70 rests on the bottom of cup 71 and has axial movement imparted to it by the thrust of rod 75.

However, in this form I supplement the action with a buffing fluid, such as oil 77, between the cup 71 and casing 73. As soon as cam 78 (Fig. 11) operates to lift rod 75, oil 77 is compressed. Some of it oozes between the square threads between parts 71, 73, which threads are purposely made loose; and finally flows into the inner sleeve or cup 71 at the top thereof. When the rod 75 is allowed to recede, the valve 79 located in the bottom of inner sleeve or cup 71 can unseat, and as springs 76 act to separate the parts, oil will flow back into the bottom space from the upper reservoir. To assist in this return flow, I may provide an additional valve arrangement 80. This valve unseats when the parts 71, 73 separate.

The operation of this form of my invention is substantially like that of the earlier forms. The springs 76 tend to elongate the structure 71—73, and thus all slack is taken up. Pressure exerted upwardly by rod 75 will cause the valve 81 to unseat; and recession of cam 78 will cause the stiff spring 82 to seat the valve 81. During upward movement of rod 75, oil 77 is compressed, and it seeps between the threads into cup 71. On the down stroke, the valves 79, 80 permit oil to return to this space where it can again act as a buffer for the succeeding operation of cam 78.

I claim:

1. In a poppet valve operating mechanism, a pair of coaxial, threadedly connected members, means acting to produce an axial force along both members, means for producing a rotational force between them, and means providing a liquid buffer between the members.

2. The combination as set forth in claim 1, with the addition of a valve controlling a space between the two members for the liquid buffer, and arranged to permit liquid to pass to the space as the members separate.

3. In a poppet valve operating mechanism, an internally threaded casing member, an externally threaded cup member threaded therein, means acting to produce an axial force along both members, means for producing a rotational force between them, and means providing a liquid buffer between the members, said mechanism being characterized in that the liquid when compressed by the axial force will be urged between the threads and into the cup.

4. In a poppet valve operating mechanism, an internally threaded casing member, an externally threaded cup member threaded therein, means acting to produce an axial force along both members, means for producing a rotational force between them, means providing a liquid buffer between the members, said mechanism being characterized in that the liquid when compressed by the axial force will be urged between the threads and into the cup, and a valve controlling a space between the two members for the liquid buffer, said valve being arranged to permit liquid to pass to the space as the members separate.

5. In a slack adjuster the combination of a plurality of members having engaging spirally inclined faces so that upon relative rotation of the members in one direction their overall length is increased and upon relative rotation of the members in the opposite direction their overall length is decreased, yielding means tending to produce relative rotation of said members in said first named direction, a dash pot for resisting reverse movement of said members, and means for reciprocating said members.

6. In poppet valve operating mechanism, a pair of coaxial threadedly connected members, means acting to produce reciprocating movement of said members, means tending to produce relative rotation of said members in a direction to increase their overall length, and a dashpot resisting reduction in overall length of said members.

7. In slack takeup mechanism a train of operating parts including relatively movable members embodying mechanical advantage, means for reciprocating said members, means operating at said mechanical advantage for moving one of said members in a direction to take up slack in the system, and a dashpot for resisting reverse movement of said member.

8. In a slack takeup mechanism the combination of an internally threaded casing, an externally threaded member threaded therein, spring means tending to unscrew said last named member out of the casing, said last named member being provided with a check valve admitting fluid to the space between the bottom of the member and the casing.

9. In a slack mechanism the combination of an internally threaded casing, an externally threaded member threaded therein, spring means tending to unscrew said last named member out of the casing, said last named member being provided with a check valve admitting fluid to the space between the bottom of the member and the casing, said externally threaded member being cup-shaped to serve as a fluid reservoir.

In testimony whereof I have hereunto set my hand.

NELSON E. WOOLMAN.